US012734400B2

(12) United States Patent
Yoo

(10) Patent No.: US 12,734,400 B2
(45) Date of Patent: Sep. 15, 2026

(54) FITNESS CONTENT CREATION APPARATUS USING SPRITES DEFINED FOR BODY PARTS

(71) Applicant: Wangyun Yoo, Busan (KR)

(72) Inventor: Wangyun Yoo, Busan (KR)

( * ) Notice: Subject to any disclaimer, the term of this patent is extended or adjusted under 35 U.S.C. 154(b) by 134 days.

(21) Appl. No.: 18/850,605

(22) PCT Filed: Jul. 29, 2024

(86) PCT No.: PCT/KR2024/010989
§ 371 (c)(1),
(2) Date: Sep. 25, 2024

(87) PCT Pub. No.: WO2025/079832
PCT Pub. Date: Apr. 17, 2025

(65) Prior Publication Data

US 2026/0175073 A1 Jun. 25, 2026

(30) Foreign Application Priority Data

Oct. 10, 2023 (KR) ........................ 10-2023-0134340

(51) Int. Cl.

| | |
|---|---|
| ***A63B 22/06*** | (2006.01) |
| ***A63B 21/00*** | (2006.01) |
| ***A63B 24/00*** | (2006.01) |
| ***A63F 13/213*** | (2014.01) |
| *A63B 71/06* | (2006.01) |

(52) U.S. Cl.
CPC ...... *A63B 22/0605* (2013.01); *A63B 21/4047* (2015.10); *A63B 22/0664* (2013.01); *A63B 24/0062* (2013.01); *A63B 24/0087* (2013.01); *A63F 13/213* (2014.09); *A63B 2071/0658* (2013.01)

(58) Field of Classification Search
CPC ............ A63B 22/0605; A63B 21/4047; A63B 22/0664; A63B 24/0062; A63B 24/0087; A63B 2071/0658; A63B 24/00; A63F 13/213; G09G 5/00
See application file for complete search history.

(56) References Cited

U.S. PATENT DOCUMENTS

| | | | | |
|---|---|---|---|---|
| 2019/0295438 | A1* | 9/2019 | Rubinstein | G09B 5/06 |
| 2022/0300236 | A1* | 9/2022 | Baijal | G06F 3/013 |
| 2023/0116004 | A1* | 4/2023 | Neuberger | A63B 24/0075 482/9 |

FOREIGN PATENT DOCUMENTS

| | | |
|---|---|---|
| KR | 102233395 B1 | 3/2021 |
| KR | 102430084 B1 | 8/2022 |

* cited by examiner

*Primary Examiner* — Michael A Faragalla
(74) *Attorney, Agent, or Firm* — STIP Law Group, LLC

(57) ABSTRACT

Proposed is a fitness content creation apparatus using sprites defined for body parts. According to the fitness content creation apparatus, a fitness content is created by combining and disposing the sprites defined for the body parts of the foot, the hand, the arm, and the buttocks such that the sprites indicate the body parts of a user required to be in contact with a floor surface according to an exercise operation of the fitness content and indicate a position of the corresponding body parts, so that a new fitness content is capable of being easily created and the user who uses the created fitness content is capable of intuitively performing an exercise without a description from a coach.

4 Claims, 8 Drawing Sheets

FIG. 1

• FOOT TOUCH (Foot Interaction)

• HAND TOUCH (Hand Interaction)

• ARM TOUCH (Arm Interaction)

• HIP TOUCH (Hip Interaction)

FIG. 8

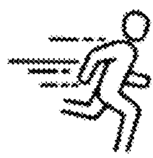

Fitness Training

1. RUNNING
2. SHUTTLE RUN
3. RUNNING IN PLACE
4. LONG JUMP
5. STRETCHING1
6. JUMPING JACKS
7. MOVING HIGH KNEES
8. JUMP HIGH KNEES
9. STEP LADDER
10. RANDOM SQUARE
11. SQUARE DRILL
12. LUNGE
13. JUMP ROPE
14. SQUAT
15. PLANK
16. SIDE STEP
17. SIDE JUMP
18. ARM WALKING
19. SINGLE LEG STAND
20. MOUNTAIN CLIMBER
21. BURPEE TEST
22. TAP STEP
23. MEDITATION
24. SPRINT
25. SWITCH STEP
26. STRETCHING 2
27. UPPER BODY TWIST
28. FRONT AND BACK STEP
29. SINGLE LEG LEFT AND RIGHT STEP
30. DIAGONAL STEP
31. IN-AND-OUT JUMPS
32. ANKLE JUMP
33. UPPER BODY TAP STEP
34. CROSS JUMPING JACKS
35. CROSS BACK STEP

FITNESS CONTENT CREATION APPARATUS USING SPRITES DEFINED FOR BODY PARTS

CROSS-REFERENCE TO RELATED APPLICATIONS

This application is the U.S. National Phase under 35 U.S.C. § 371 of International Application No. PCT/KR2024/010989, filed on Jul. 29, 2024, which in turn claims the benefit of Korean Application No. 10-2023-0134340, filed on Oct. 10, 2023, the disclosures of which are incorporated by reference into the present application.

TECHNICAL FIELD

The present disclosure relates to a content creation apparatus. More particularly, the present disclosure relates to a fitness content creation apparatus using sprites defined for body parts.

BACKGROUND ART

Contents described in this part merely provide background information of an embodiment of the present disclosure, and do not constitute a conventional technology.

Since ordinary fitness training is performed by using an apparatus, there is a risk of injury due to an incorrect exercise. Furthermore, since an exercise that can be performed by using a specialized apparatus is limited, there is a problem that a user may easily feel tired. In addition, in an apparatus such as a treadmill for aerobic exercise, since an exercise process is monotonous and only a predetermined course is repeated, there is a problem that a user often gives up the exercise halfway.

In order to solve these conventional problems, an augmented reality interactive sports apparatus capable of allowing user to perform various exercises without using a separate object or wearing an apparatus has been developed (see Korean Patent No. 10-2233395 (title of the invention: AUGMENTED REALITY INTERACTIVE SPORTS APPARATUS USING LIDAR SENSORS, registered on Mar. 23, 2021), Korean Patent No. 10-2430084 (title of the invention: AUGMENTED REALITY INTERACTIVE SPORTS SYSTEM USING LIDAR SENSORS, registered on Aug. 2, 2022), and so on).

Such an augmented reality interactive sports apparatus is capable of controlling an interaction between a sports content and a user by projecting an image for the content on a floor surface and tracking a motion of the user who uses the sports content by using a lidar sensor. Therefore, the user can enjoy sports indoors without having to wear a separate object or a separate apparatus, the floor surface is capable of being efficiently used since a range of motion tracking is wide. Furthermore, by tracking the user's motion by using two lidar sensors, each user's motion can be rapidly and accurately tracked even when multiple users use the sports content at the same time.

In such an augmented reality interactive sports apparatus, since the more diverse the content, the more interest in exercise can be induced and the more various body parts are capable of being exercised, thus continuous development of the content is required.

The background art is technical information possessed by the inventors for the derivation of the disclosure or obtained during the derivation of the disclosure, and is not necessarily known technology disclosed to the general public prior to the filing of the disclosure.

DISCLOSURE

Technical Problem

Accordingly, the present disclosure has been made keeping in mind the above problems occurring in the related art, and an objective of the present disclosure is to provide a fitness content creation apparatus using sprites defined for body parts, the fitness content creation apparatus being configured such that a fitness content is created by combining and disposing the sprites defined for the body parts of the foot, the hand, the arm, and the buttocks so that the sprites indicate the body parts of a user required to be in contact with a floor surface according to an exercise operation of the fitness content and indicate a position of the corresponding body parts, thereby allowing a new fitness content to be easily created and allowing the user who uses the created fitness content to intuitively perform an exercise without a description from a coach.

In addition, another objective of the present disclosure is to provide a fitness content creation apparatus using sprites defined for body parts, the fitness content creation apparatus being configured such that an interaction performance between a user and a fitness content is capable of being consistently expressed and the user is capable of visually checking a result of an exercise operation since an effect capable of being applied to the sprite is added to the sprite so that the added effect is applied to the corresponding sprite when an event occurs.

It should be understood, however, that the scope of the present disclosure is not limited to the above and that the objects and effects which can be understood from the solution means and the embodiments of the present disclosure are also included therein even if not explicitly mentioned.

Technical Solution

In order to achieve the above objectives, according to the present disclosure, there is provided a fitness content creation apparatus using sprites defined for body parts, the fitness content creation apparatus being played on an augmented reality interactive sports apparatus configured to control an interaction between a content and a user by projecting an image on a floor surface and tracking a user's motion, and the fitness content creation apparatus including:

a sprite storage part configured to store sprites defined for body parts of the foot, the hand, the arm, and the buttocks;

a content editing part configured to load the sprites stored in the sprite storage part and to combine and dispose at least one of the sprites by a control of the user; and a content creation part configured to create a fitness content by a control of the content editing part such that the disposed sprites indicate the body parts of the user required to be in contact with the floor surface in the fitness content and indicate each position of corresponding body parts.

Preferably, the sprite storage part may store the sprites having predetermined shapes and predetermined sizes, and may store the sprites defined in different shapes according to the body parts.

More preferably, the sprite storage part may store a square-shaped sprite defined for the foot, a circular-shaped sprite defined for the hand, an elliptical-shaped sprite defined for the arm, and a hexagonal-shaped sprite defined for the buttocks.

Preferably, the fitness content creation apparatus may further include an effect storage part configured to store effects capable of being applied to the sprites.

More preferably, the content editing part may be configured to load the effects stored in the effect storage part and to add at least one of the effects to the sprites by the control of the user.

More preferably, the content creation part may be configured to create the fitness content such that the effects added to the sprites where an event occurs are applied when a body position of the user tracked in the augmented reality interactive sports apparatus corresponds to the sprites and the event occurs in the corresponding sprites.

Preferably, the augmented reality interactive sports apparatus may be configured to determine whether or not to trigger an event by tracking the user's motion by using each lidar sensor part.

Advantageous Effects

According to the fitness content creation apparatus using the sprites defined for the body parts, the fitness content is created by combining and disposing the sprites defined for the body parts of the foot, the hand, the arm, and the buttocks such that the sprites indicate the body parts of the user required to be in contact with the floor surface according to the exercise operation of the fitness content and indicate the position of the corresponding body parts, so that the new fitness content is capable of being easily created and the user who uses the created fitness content is capable of intuitively performing the exercise without a description from the coach.

In addition, according to the fitness content creation apparatus using the sprites defined for the body parts of present disclosure, since the effect capable of being applied to the sprite is added to the sprite so that the added effect is applied to the corresponding sprite when the event occurs, the interaction performance between the user and the fitness content is capable of being consistently expressed and the user is capable of visually checking the result of the exercise operation.

In addition, various and beneficial advantages and effects of the present disclosure are not limited to the above, and will be more easily understood in the course of describing specific embodiments of the present disclosure.

DESCRIPTION OF DRAWINGS

FIG. 1 is a view illustrating a configuration of a fitness content creation apparatus using sprites defined for body parts according to an embodiment of the present disclosure.

FIG. 8 is a view illustrating a list of fitness content created through the fitness content creation apparatus using the sprites defined for the body parts according to an embodiment of the present disclosure.

DESCRIPTION OF REFERENCE NUMERALS

Figure 2:
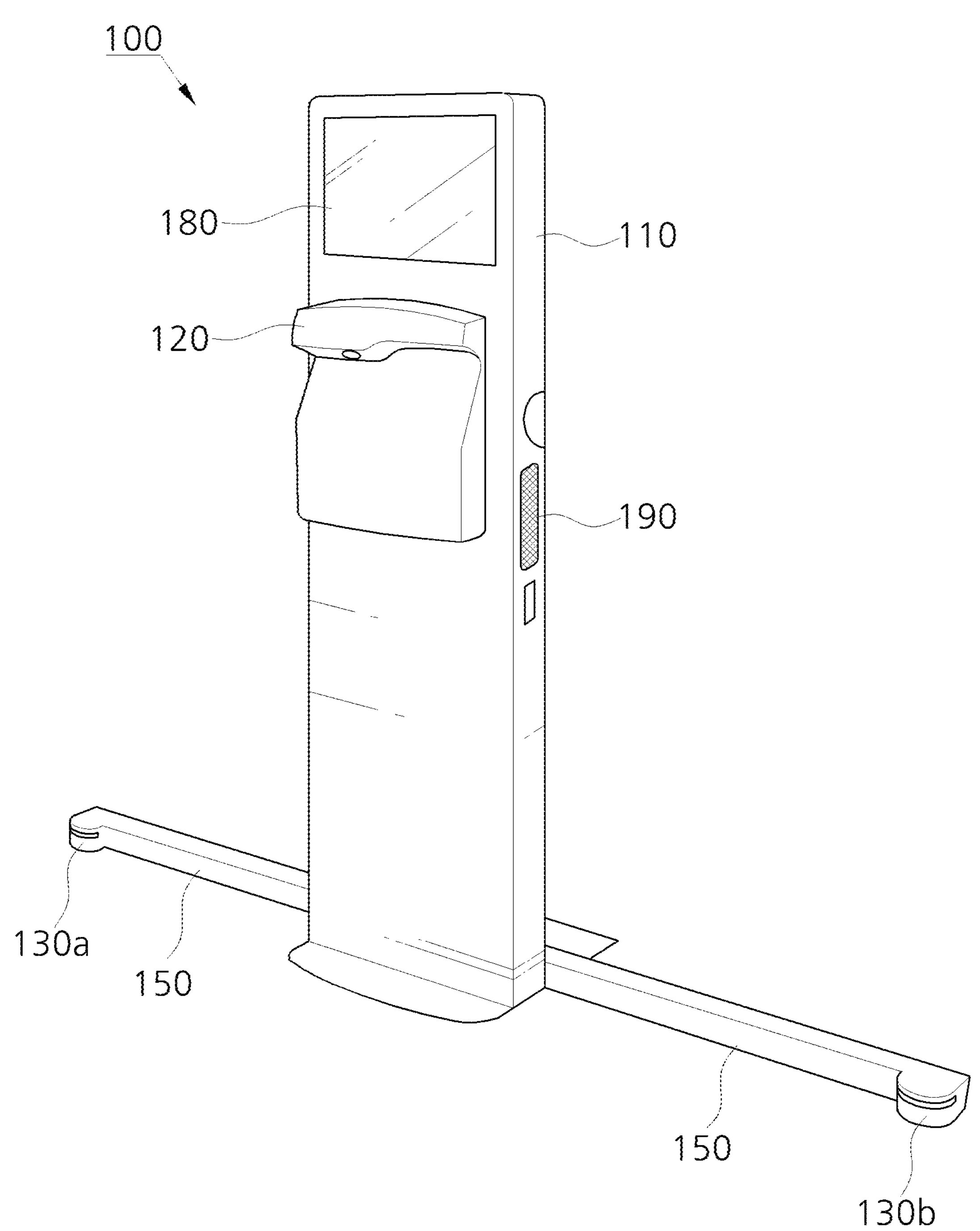
FIG. 2 is a view illustrating an appearance of an augmented reality interactive sports apparatus used in the fitness content creation apparatus using the sprites defined for the body parts according to an embodiment of the present disclosure.

100: Augmented reality interactive sports apparatus
110: Main body
120: Projector part
130*a*, 130*b*: Lidar sensor parts
150: Sensor connection part
180: Display part
190: Speaker part
200: Content creation apparatus
210. Sprite storage part
220: Effect storage part
1230. Content editing part
240: Content creation part

MODE FOR INVENTION

Hereinafter, an embodiment of the present disclosure will be described in detail with reference to the accompanying drawings such that a person having ordinary knowledge in the technical field to which the present disclosure belongs may easily implement the embodiment of the present disclosure. However, it is understood that the present disclosure is able to be implemented in various different forms and is not limited to the embodiment described herein. In addition, parts in the drawings unrelated to the detailed description are omitted to ensure clarity of the present disclosure, and like reference numerals in the drawings denote like elements throughout.

Throughout the specification, it will be understood that when an element is referred to as being "connected" to another element, it can be directly connected to the other element or it can be indirectly connected with the other element and intervening elements may be present therebetween. In addition, it will be further understood that when a part "comprises", "includes", or "has" an element, this means that other elements are not excluded but may be further included, unless otherwise stated. It will be further understood that the terms "comprises", "includes", or "has" used in this specification, specify the presence of stated features, steps, operations, components, parts, or a combination thereof, but do not preclude the presence or addition of one or more other features, numerals, steps, operations, components, parts, or a combination thereof.

Following embodiments described hereinafter are detailed descriptions of the present disclosure to facilitate understanding of the present disclosure and are not intended to limit the scope of the present disclosure. Thus, a subject matter having the same scope and performing the same function as those of the present disclosure also fall within the protection scope of the present disclosure.

The components, processes, steps, or methods according to embodiments of the disclosure may be shared as long as they do not technically conflict with each other.

Figure 1:
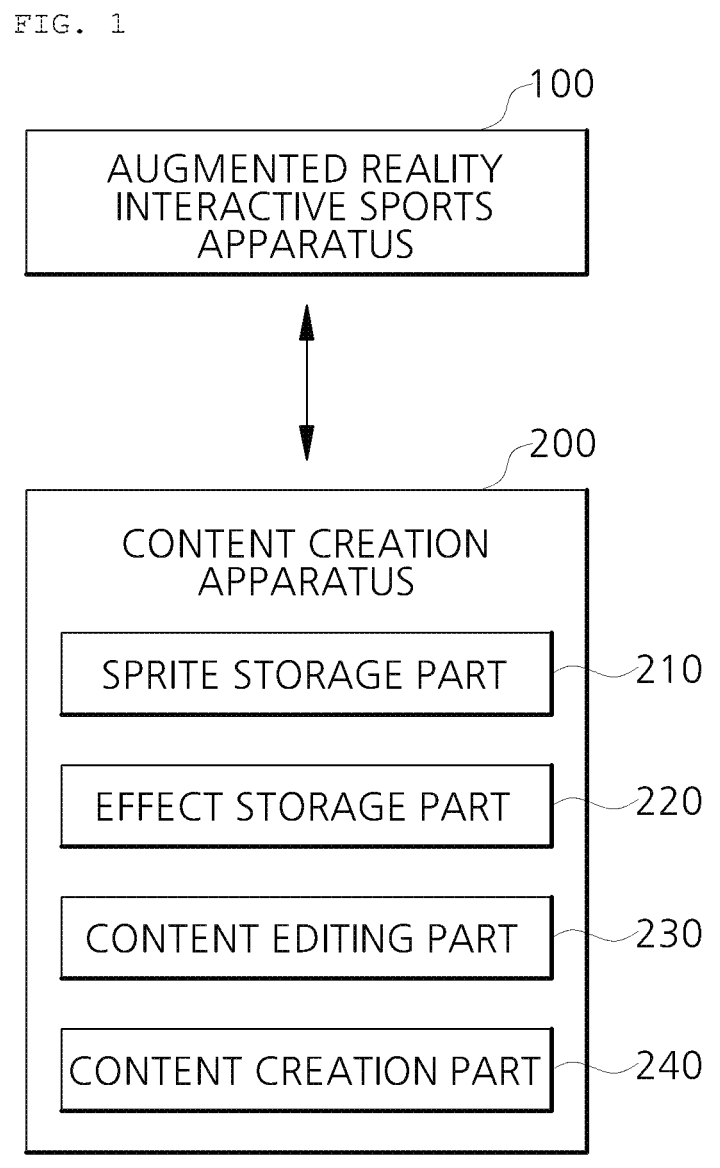

FIG. 1 is a view illustrating a configuration of a fitness content creation apparatus 200 using sprites defined for body parts according to an embodiment of the present disclosure. As illustrated in FIG. 1, a fitness content creation apparatus 200 using the sprites defined for the body parts according to an embodiment of the present disclosure is a content creation apparatus 200 configured to create a fitness content played on an augmented reality interactive sports apparatus 100 that projects an image on a floor surface and controls an interaction between the content and a user by tracking a user's motion. Furthermore, the fitness content creation apparatus 200 may include a sprite storage part 210, a content editing part 230, and a content creation part 240, and may further include an effect storage part 220. In the fitness content creation apparatus 200 using the sprites defined for the body parts according to an embodiment of the present disclosure, the fitness content created by communicating with the augmented reality interactive sports apparatus 100 in a wired manner or a wireless manner may be played on the augmented reality interactive sports apparatus 100.

FIG. 2 is a view illustrating an appearance of the augmented reality interactive sports apparatus 100 used in the fitness content creation apparatus 200 using the sprites defined for the body parts according to an embodiment of the present disclosure. As illustrated in FIG. 2, the augmented reality interactive sports apparatus 100 may include: a main body 110; a projector part 120 provided on a front surface of the main body 110 and configured to project an image for a fitness content on a floor surface; each lidar sensor part 130*a* and 130*b* mounted toward a projection direction of the projector part 120; a motion tracking part (not illustrated) configured to recognize a user's position according to the fitness content by using each lidar sensor part 130*a* and 130*b* and to track a user's motion; a sensor connection part 150 having a first distal end connected to a side surface of a lower end of the main body 110 and having a second distal end connected to each lidar sensor part 130*a* and 130*b*, thereby connecting each lidar sensor part 130*a* and 130*b* to the main body 110 such that each lidar sensor part 130*a* and 130*b* is spaced apart from the main body 110 by a predetermined distance; and a control part (not illustrated) configured to output the fitness content through the projector part 120 so that the fitness content is provided to the user on the basis of an augmented reality, the control part being configured to control an interaction between the fitness content and the user by using the user's motion that is tracked in the motion tracking part (not illustrated). Furthermore, the augmented reality interactive sports apparatus 100 may further include: a display part 180 configured to receive a selection signal of the fitness content and to output play information related to the fitness content; and a speaker part 190 configured to output sound related to the fitness content.

Here, each lidar sensor part 130*a* and 130*b* may include at least two lidar sensors that are respectively connected to both side surfaces of the lower end of the main body 110 through the sensor connection part 150, and may identify each user's position by avoiding tracking failure in a laser scanning shade region due to a relative position of a plurality of users. In addition, the motion tracking part may recognize a body part position in contact with the floor surface by laser scanning a plane at a predetermined height (about 1 cm to 7 cm from the floor surface) from the ground by using each lidar sensor part 130*a* and 130*b*, and may track the user's motion by tracking a change in position of the user's body part.

The detailed content of the augmented reality interactive sports apparatus 100 may be configured with reference to Korean Patent No. 10-2233395 (title of the invention: AUGMENTED REALITY INTERACTIVE SPORTS APPARATUS USING LIDAR SENSORS, registered on Mar. 23, 2021), Korean Patent No. 10-2430084 (title of the invention: AUGMENTED REALITY INTERACTIVE SPORTS SYSTEM USING LIDAR SENSORS, registered on Aug. 2, 2022), and so on.

Hereinafter, each configuration of the fitness content creation apparatus 200 using the sprites defined for the body parts according to an embodiment of the present disclosure will be described in detail with reference to FIG. 1 and FIG. 2.

The sprite storage part 210 may store sprites respectively defined for body parts of the foot, the hand, the arm, and the buttocks. More specifically, the sprite storage part 210 may store sprites in which shapes and sizes thereof are determined, and may store sprites defined in different shapes according to the body parts. Here, a sprite is a two-dimensional graphic or an object synthesized in an image in computer graphics, and is an object capable of being moved independently of a background. The sprite storage part 210 uses the sprites having predefined shapes according to the body parts, so that the user may intuitively distinguish each of the sprites and may understand a content performance method.

Figure 3:
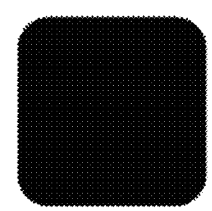
FIG. 3 is a view illustrating sprites used in the fitness content creation apparatus using the sprites defined for the body parts according to an embodiment of the present disclosure.
Figure 3:
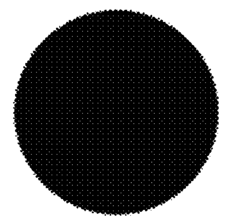
Figure 3:
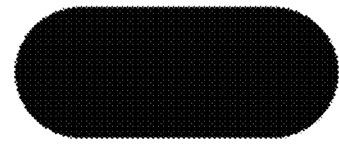
Figure 3:
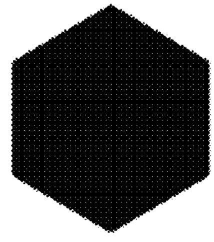

FIG. 3 is a view illustrating sprites used in the fitness content creation apparatus 200 using the sprites defined for the body parts according to an embodiment of the present disclosure. As illustrated in FIG. 3, the sprite storage part 210 of the fitness content creation apparatus 200 using the sprites defined for the body parts according to an embodiment of the present disclosure may store a square-shaped sprite defined for the foot, a circular-shaped sprite defined for the hand, an elliptical-shaped sprite defined for the arm, and a hexagonal-shaped sprite defined for the buttocks. By using the augmented reality interactive sports apparatus 100 as illustrated in FIG. 2, the user may perform an exercise operation on the floor by using the fitness content projected on the floor. fundamentally, the exercise operation may be performed by touching four parts of the hand, the foot, the arm, and the buttocks on the floor surface. In the present disclosure, since the body parts touching the floor surface during the exercise operation are expressed in different shapes, the user may intuitively understand a play method of the fitness content without any separate explanation, and the user may perform the exercise operation by touching each sprite with the body parts corresponding to each shape.

As described above, in the fitness content creation apparatus 200 using the sprites defined for the body parts according to an embodiment of the present disclosure, a new exercise may be easily created by combining the sprites defined for the body parts of the foot, the hand, the arm, and the buttocks stored in the sprite storage part 210, and the user who uses the created fitness content may intuitively perform the exercise without a description from a coach.

The effect storage portion 220 may store an effect that may be applied to a sprite. Here, the effect is an element applied to each sprite when an event such as a sprite being touched by the user's body occurs, and may include a color change of the sprite, an addition of a shape of the sprite, an animation of the sprite, and so on. For example, when an event occurs in the sprite, there may be effects such as a color of the sprite being changed, the sprite being flickered, a shape same as a border of the sprite being added so that a size of the sprite is gradually increased, a strip having a specific color being rotated along the border of the stripe, an image in the form of fireworks having a color different from the stripe being added, and so on. By applying such an effect to the sprite, an interaction performance between the user and the fitness content may be consistently expressed, and a result of the exercise operation may be visually checked by the user.

The content editing part 230 may load the sprite stored in the sprite storage part 210 by a control of the user, and may combine and dispose at least one sprite. Here, according to the exercise operation of the fitness content to be created, as illustrated in FIG. 3, the user may dispose each sprite defined for each body part at a position in which the body part of the foot, the hand, the arm, and the buttocks is required to contact the floor.

More specifically, the content editing part 230 may load the effect stored in the effect storage part 220 by the control of the user, and may add at least one effect to the sprite. That is, an effect to be applied to the sprite when an event occurs such as a contact of a user's body part to the disposed sprite may be added and set. At this time, the effect added to the sprite may be a plurality of effects, and effects different from each other may be added according to the event type. For example, effects different from each other may be respectively added to a sprite touch event and an event for completing one exercise operation. That is, a user who edits and creates the fitness content may edit the fitness content by placing the sprite and adding the effect to the sprite through the content editing part 230.

In the content creation part 240, by controlling the content editing part 230, the fitness content may be created such that the sprite indicates the user's body part required to be in contact with the floor surface in the fitness content and indicates each position of the corresponding body part. In the content creation part 240, the fitness content may be created such that an effect added to the sprite where an event occurs is applied when the user's body position tracked in the augmented reality interactive sports apparatus 100 corresponds to the sprite and then the event occurs in the sprite. That is, the content creation part 240 may create the fitness content from a content edited in the content editing part 230.

In the augmented reality interactive sports apparatus 100, whether or not to trigger an event may be determined by tracking the user's motion by using each lidar sensor part 130*a* and 130*b*. For example, in the fitness content, an event may be determined to be triggered when a position or a region of the sprite projected on the floor surface and a position of the detected body part such as the foot, the hand, and so on correspond to each other. More specifically, an event may be determined to be triggered when a region of the sprite projected on the floor surface overlaps with at least a portion of a region of the detected body part, a specific position of the sprite corresponds to a region of the detected body part, or when at least a predetermined ratio of a region of the body part overlaps with a region of the sprite.

Figure 4:
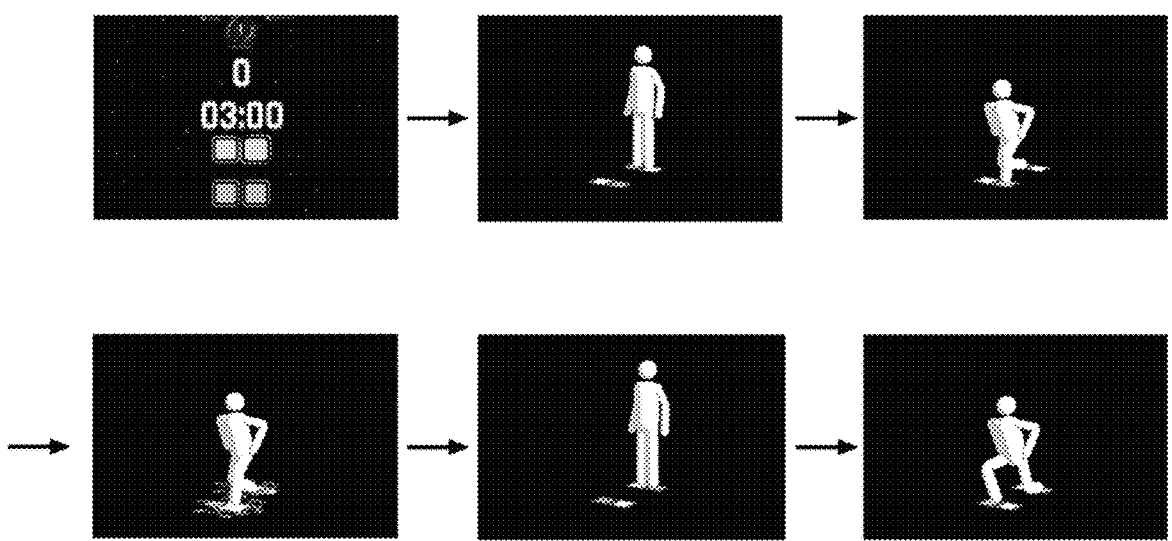
FIG. 4 is a view illustrating a lunge content as an example created through the fitness content creation apparatus using the sprites defined for the body parts according to an embodiment of the present disclosure.

FIG. 4 is a view illustrating a lunge content as an example created through the fitness content creation apparatus 200 using the sprites defined for the body parts according to an embodiment of the present disclosure. As illustrated in FIG. 4, the lunge content may be created in the fitness content creation apparatus 200 using the sprites defined for the body parts according to an embodiment of the present disclosure, and the created lunge content may be provided by being projected on the floor surface through the augmented reality interactive sports apparatus 100. That is, a screen as shown in the first drawing in FIG. 4 may be projected on the floor surface. Here, four square-shaped sprites ("foot sprites") defined for the foot are disposed. Two of the foot sprites are colored blue, so that the user can easily identify the sprites to which the current user's foot is required to be positioned. As illustrated in FIG. 4, a lunge operation may be performed by standing on the foot sprites at a lower end and then by stepping the foot sprite at an upper end and the foot sprite at the lower end by alternating the left feet and the right feet. At this time, by changing the color of the foot sprites where the user's foot is required to be positioned for the lunge operation or by displaying the foot sprites to be flickered (shown as flickering blue in FIG. 4), the user may easily perform the lunge operation. When a preset time elapses in a lunge operation state, the lunge is counted as one repetition, and an effect in the form of a red firework is applied. Furthermore, when the color of the foot sprite is changed and the foot sprite is displayed to be flickered for the opposite lunge operation, the user may perform the lunge operation by moving the left feet and the right feet to the corresponding sprites.

Figure 5:
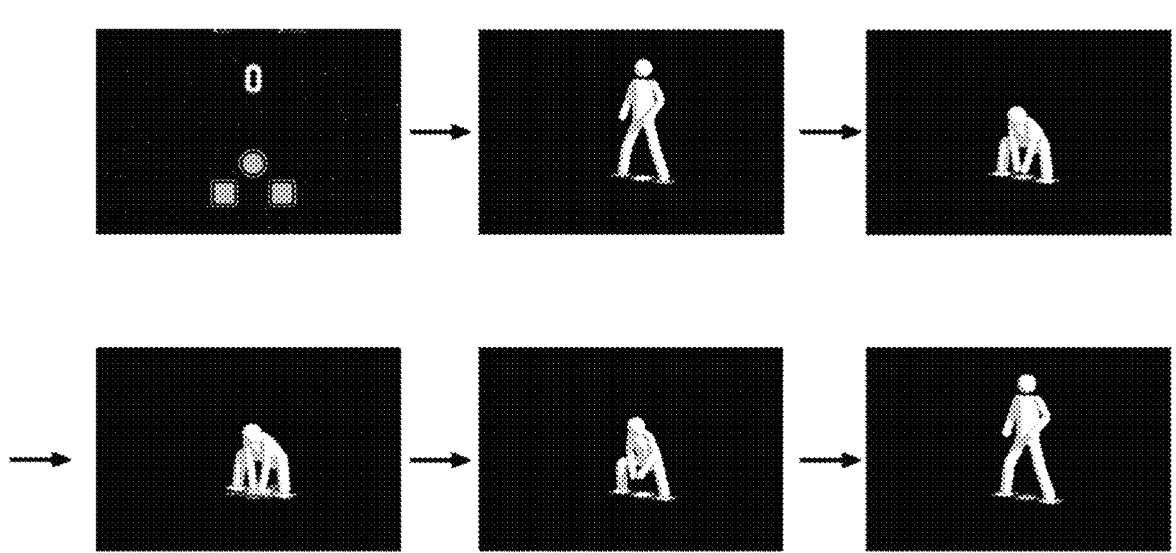
FIG. 5 is a view illustrating a squat content as an example created through the fitness content creation apparatus using the sprites defined for the body parts according to an embodiment of the present disclosure.

FIG. 5 is a view illustrating a squat content as an example created through the fitness content creation apparatus 200 using the sprites defined for the body parts according to an embodiment of the present disclosure. As illustrated in FIG. 5, the squat content may be created in the fitness content creation apparatus 200 using the sprites defined for the body parts according to an embodiment of the present disclosure, and a screen as shown in the first drawing in FIG. 5 may be projected on the floor surface through the augmented reality interactive sports apparatus 100. Here, two square-shaped foot sprites may be disposed and one circular-shaped hand sprite may be disposed at a vertex position of an isosceles triangle with the two square-shaped foot sprites as a base of the isosceles triangle. The user may stand on the foot sprites and perform a squat operation by slowly lowering the buttocks while the user's waist in a straight state and then by touching the circular-shaped hand sprite. As illustrated in the fourth drawing in FIG. 5, when an event occurs by touching the hand sprite, an effect in the form of a red firework may be applied.

Figure 6:
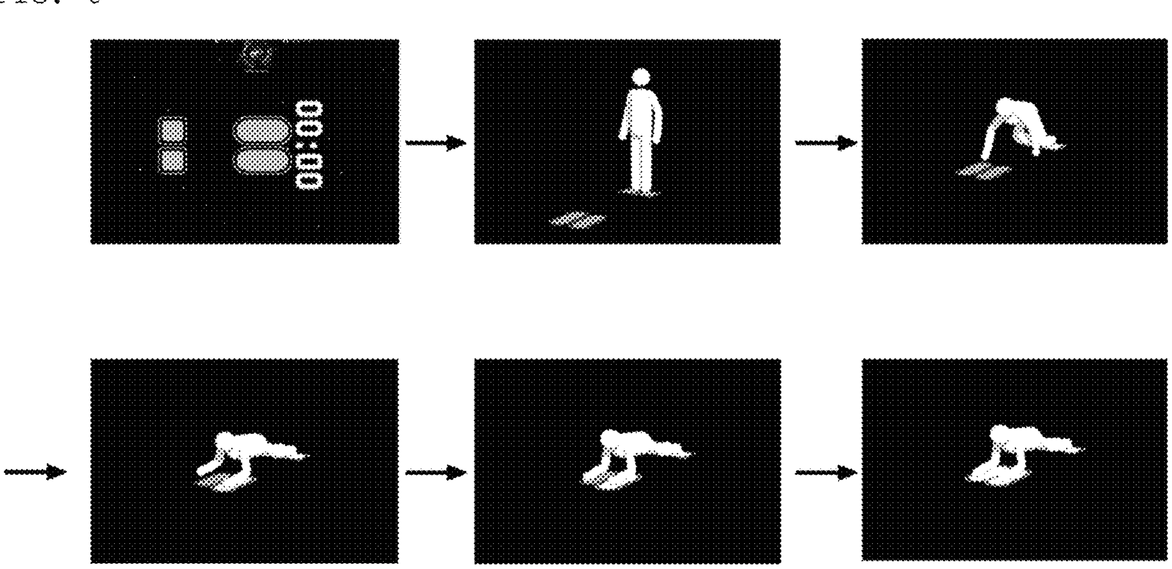
FIG. 6 is an example view illustrating a plank content as an example created through the fitness content creation apparatus using the sprites defined for the body parts according to an embodiment of the present disclosure.

FIG. 6 is a view illustrating a plank content as an example created through the fitness content creation apparatus 200 using the sprites defined for the body parts according to an embodiment of the present disclosure. As illustrated in FIG. 6, the plank content may be created in the fitness content creation apparatus 200 using the sprites defined for the body parts according to an embodiment of the present disclosure, and a screen as shown in the first drawing in FIG. 6 may be projected on the floor surface through the augmented reality interactive sports apparatus 100. Here, two square-shaped foot sprites and two elliptical-shaped arm sprites which are spaced apart from the two square-shaped foot sprites by a predetermined distance and which are disposed side by side may be combined and disposed. The user may perform a plank operation by simultaneously and closely contacting the elbow and the fist to the arm sprites while the user is in a state in which the user stands on the foot sprites and the knee and the pelvis are raised. When a touch event according to the plank operation occurs on the foot sprites and the arm sprites, an effect of changing the color of the sprites is applied, so that the user may easily check an interaction result according to the fitness operation. Such a plank position may be maintained for a set period of time.

Figure 7:
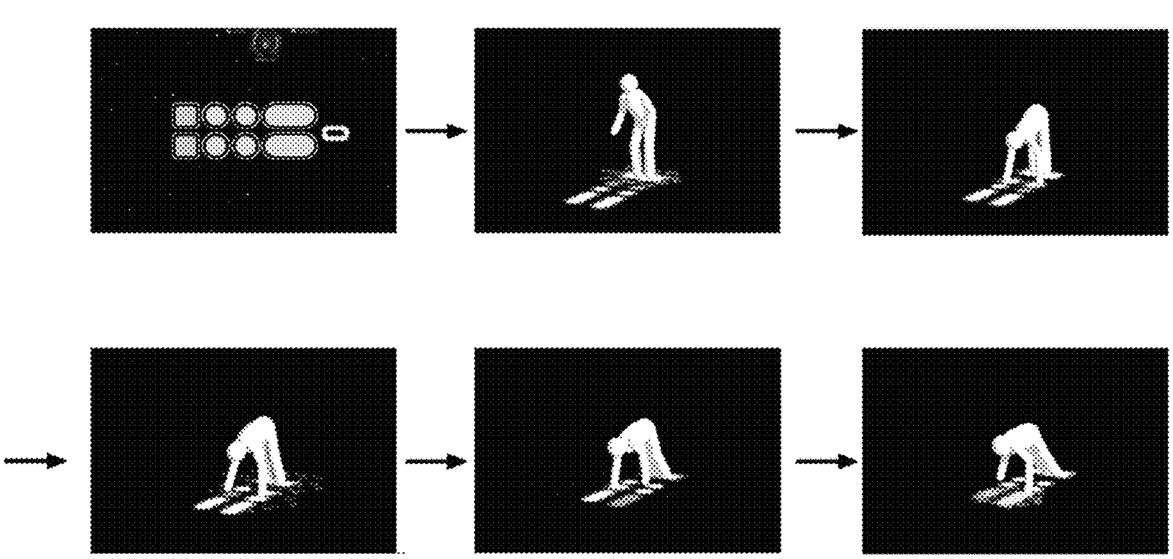
FIG. 7 is an example view illustrating an arm walking content as an example created through the fitness content creation apparatus using the sprites defined for the body parts according to an embodiment of the present disclosure.

FIG. 7 is a view illustrating an arm walking content as an example created through the fitness content creation apparatus 200 using the sprites defined for the body parts according to an embodiment of the present disclosure. As illustrated in FIG. 7, the arm walking content may be created in the fitness content creation apparatus 200 using the sprites defined for the body parts according to an embodiment of the present disclosure, and a screen as shown in the first drawing in FIG. 7 may be projected on the floor surface through the augmented reality interactive sports apparatus 100. Here, two square-shaped foot sprites, four circular-shaped hand sprites, and two elliptical-shaped arm sprites may be combined, and may be disposed side by side in the order of the feet, the hand, the hand, and the arm. In a state in which the user stands on the foot sprites such that the user's foot are fixed, the user move the user's hand to the arm sprite by touching the hand sprites one by one with the user's hand such that the user extends the user's body and lies face down, and then the user performs a reverse operation by touching the hand sprites one by one with the user's hand such that the user's hand is moved close to the user's foot and then the user stands up, thereby capable of performing the arm walking operation. At this time, as the next touch point is indicated by changing the color of the sprites, the user may easily and accurately perform the operation.

FIG. 8 is a view illustrating a list of fitness content created through the fitness content creation apparatus 200 using the sprites defined for the body parts according to an embodiment of the present disclosure. As illustrated in FIG. 8, the fitness content creation apparatus 200 using the sprites defined for the body parts according to an embodiment of the present disclosure may implement various fitness content including the lunge, the squat, the plank, the arm walking, and so on by using the sprites defined for the body parts of the foot, the hand, the arm, and the buttocks. Since the shapes of the sprites are predefined, the user may easily create a new fitness content by utilizing the sprites corresponding to the body parts that are required to be in contact with the floor surface for each fitness operation.

As described above, according to the fitness content creation apparatus 200 using the sprites defined for the body parts proposed in the present disclosure, the fitness content is created by combining and disposing the sprites defined for the body parts of the foot, the hand, the arm, and the buttocks such that the sprites indicate the body parts of the user required to be in contact with the floor surface according to the exercise operation of the fitness content and indicate the position of the corresponding body parts, so that a new fitness content is capable of being easily created and the user who uses the created fitness content is capable of intuitively performing an exercise without a description from a coach. In addition, according to the present disclosure, since an effect capable of being applied to the sprite is added to the sprite so that the added effect is applied to the corresponding sprite when an event occurs, an interaction performance between the user and the fitness content is capable of being consistently expressed and a user is capable of visually checking a result of the exercise operation.

Meanwhile, the present disclosure may include a computer-readable recording medium including program commands for performing operations implemented by various communication terminals. Examples of the computer-readable recording medium include: magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction.

The computer-readable recording medium may include program commands, data files, data structures, and the like separately or in combinations. Herein, the program commands being recorded in the computer-readable medium may correspond to a program command that is specifically designed and configured for the embodiments of the present disclosure, or the program command may correspond to a program command that is disclosed and available to anyone skilled in or related to computer software. For example, the program commands may include machine language codes, which are created by a compiler, as well as high-level language codes, which may be executed by a computer by using an interpreter.

Although embodiments of the present disclosure have been described for illustrative purposes, those skilled in the art will appreciate that various modifications, additions and substitutions are possible, without changing the spirit or essential features of the present disclosure. Therefore, it should be understood that, in every aspect, the embodiments described above are examples and are not restrictive. For example, any component described as having an integrated form may be implemented in a distributed form, and any component described as having a distributed form may also be implemented in an integrated form.

The scope of the present disclosure is represented by the following claims, rather than the detailed description, and it is to be construed that the meaning and scope of the claims and all variations or modified forms derived from the equivalent concept thereof are encompassed within the scope of the present disclosure.

The invention claimed is:

1. A fitness content creation apparatus (200) configured to create fitness content to be played on an augmented reality interactive sports apparatus (100) configured to control an interaction between the fitness content and a user by projecting an image on a floor surface and tracking a user's motion, the fitness content creation apparatus (200) comprising:

a memory storing:

a sprite storage area (210) storing sprites defined for body parts comprising a foot, a hand, an arm, and buttocks; and an effect storage area (220) storing effects applicable to the sprites; and one or more processors configured to execute program commands stored in the memory to:

load the sprites stored in the sprite storage area and combine and dispose at least one of the sprites according to a user control;

load the effects stored in the effect storage area and add at least one of the effects to at least one of the sprites according to the user control; and create the fitness content such that the disposed sprites indicate the body parts of the user required to contact the floor surface in an exercise operation of the fitness content and indicate positions of the corresponding body parts, and such that, when a body position of the user tracked in the augmented reality interactive sports apparatus corresponds to a sprite of the disposed sprites and an event occurs in the sprite, an effect added to the sprite is applied.

2. The fitness content creation apparatus (200) of claim 1, wherein the sprites stored in the sprite storage area (210)

have predetermined shapes and predetermined sizes and are defined in different shapes according to the body parts.

3. The fitness content creation apparatus (200) of claim 2, wherein the sprites stored in the sprite storage area (210) comprise a square-shaped sprite defined for the foot, a circular-shaped sprite defined for the hand, an elliptical-shaped sprite defined for the arm, and a hexagonal-shaped sprite defined for the buttocks.

4. The fitness content creation apparatus (200) of claim 1, wherein the augmented reality interactive sports apparatus (100) includes first and second lidar sensor parts (130*a*, 130*b*), and is configured to determine whether to trigger the event by tracking the user's motion using the first and second lidar sensor parts, wherein the first and second lidar sensor parts are configured to laser-scan a plane at a predetermined height of about 1 cm to about 7 cm from the floor surface to recognize a position of a body part in contact with the floor surface.

* * * * *